(12) United States Patent
Levy et al.

(10) Patent No.: US 6,775,393 B2
(45) Date of Patent: Aug. 10, 2004

(54) HARDCOPY WATERMARKING

(75) Inventors: Avraham Levy, Kiryat Tivon (IL); Doron Shaked, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 172 days.

(21) Appl. No.: 09/840,575

(22) Filed: Apr. 23, 2001

(65) Prior Publication Data

US 2002/0176599 A1 Nov. 28, 2002

(51) Int. Cl.$^7$ .................................................. G06K 9/00
(52) U.S. Cl. .......................................................... 382/100
(58) Field of Search ............................... 382/100, 232, 382/191, 115; 358/3.28; 380/51, 54; 713/176

(56) References Cited

U.S. PATENT DOCUMENTS

| | | | |
|---|---|---|---|
| 5,809,139 A | | 9/1998 | Girod et al. |
| 5,848,155 A | * | 12/1998 | Cox ............................ 382/191 |
| 5,859,920 A | * | 1/1999 | Daly et al. ................... 382/115 |
| 6,208,735 B1 | * | 3/2001 | Cox et al. .................... 380/54 |
| 6,523,114 B1 | * | 2/2003 | Barton ......................... 713/176 |

FOREIGN PATENT DOCUMENTS

| | | |
|---|---|---|
| EP | 0766468 A2 | 4/1997 |
| EP | 0991279 A2 | 4/2000 |

OTHER PUBLICATIONS

Chen et al., "Dither modulation: a new approach to digital watermarking and information embedding," SPIE Col. 3657, Jan. 1999.
Cox et al., "Secured spread spectrum watermarking for multimedia," NEC Research Institute, Technical Report 95–10.
XP–000921838 "Digital Watermarking Using Inter–Block Correlation" by Yoonki Choi and Kiyoharu Aizawdated Oct. 24, 1999 the whole document.

* cited by examiner

*Primary Examiner*—Vikkram Bali

(57) ABSTRACT

A digital image is hardcopy watermarked by modifying transform coefficients in a transform domain representation of the digital image, the transforms coefficients being modified according to bit values of an n-bit message. A message in a hardcopy watermarked image is identified by statistically decoding a transform domain representation of the watermarked image.

41 Claims, 3 Drawing Sheets

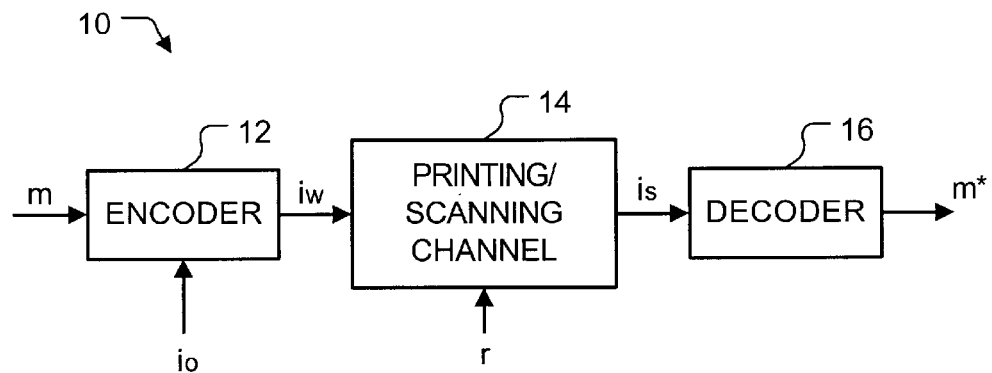
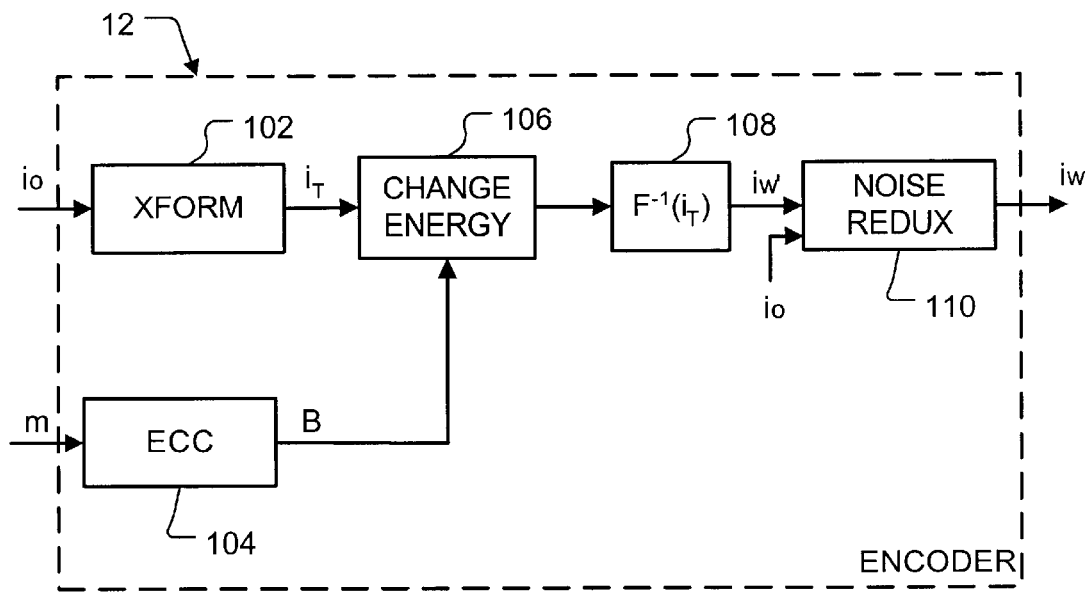

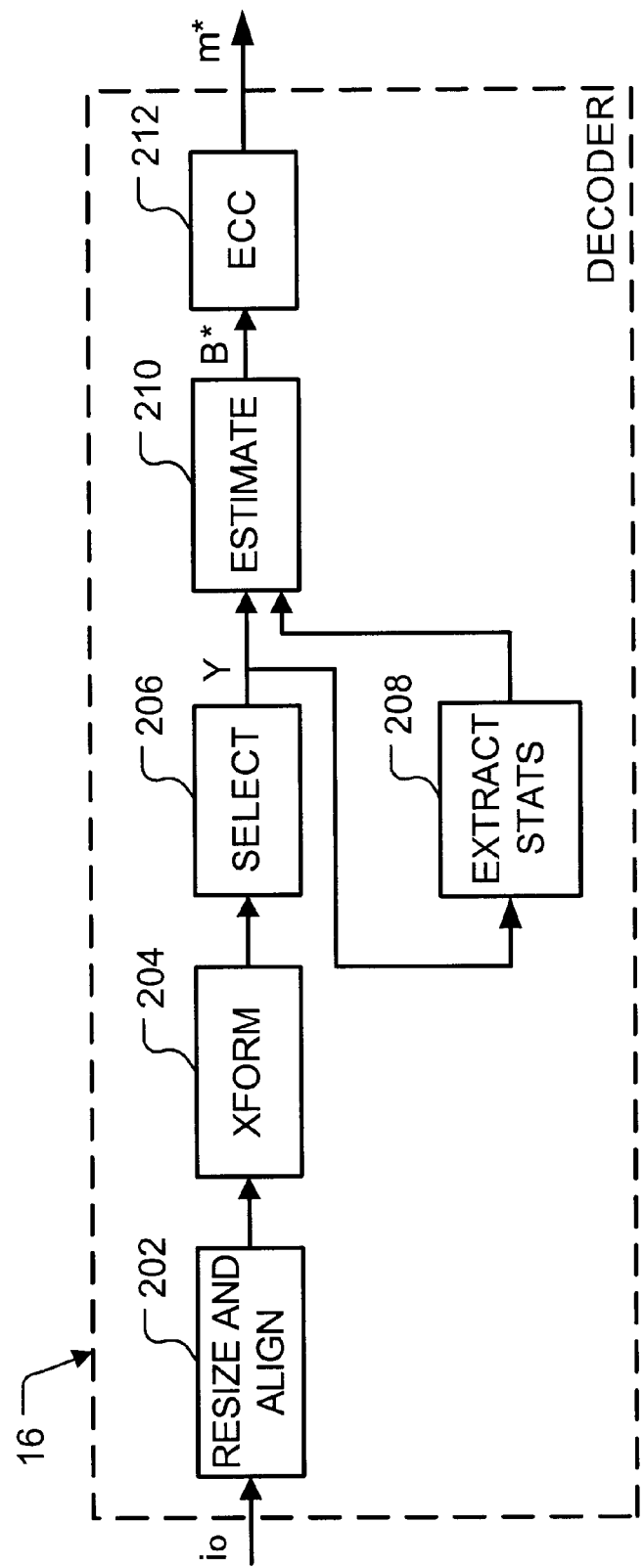

HARDCOPY WATERMARKING

BACKGROUND

The fast development of digital information technology, combined with the simplicity of duplicating and distributing data across communications networks such as the Internet, has exposed content providers to a real challenge of protecting their content. This challenge has resulted in research and development of sophisticated watermarking and information-hiding methodologies.

Hardcopy watermarking involves modifying a digital image such that secret information is embedded in a hardcopy (e.g., a printed version) of the digital image. The secret information might be information about the image, information about the owner of the image, anti-counterfeit information, etc. The secret information is not visible or it is perceived as noise. However, the secret information can be detected by converting the hardcopy back to a digital image, and decoding the digital image.

Design parameters for hardcopy watermarking include robustness of decoding in view of image quality degradation inflicted by printing, scanning, and other affects (e.g., cropping, misalignment, stains and scratches); visual quality of the hardcopy; and coding rate. The coding rate—the relative amount of secret information that can be reliably embedded in the digital image—typically involves a tradeoff with visual quality and robustness. A higher coding rate allows more information to be embedded in the image, but tends to reduce the visual quality of the image and robustness in decoding the message. Conversely, a lower coding rate tends to provide less information, but the image has a higher visual quality and the decoding is more robust. It would be desirable to perform hardcopy watermarking that is robust, has a high coding rate and does not degrade the visual quality of the hardcopy.

Decoding the watermarked image typically requires access to the original image. In some instances, however, the original image is not available. In other instances, it might be desirable to perform the decoding without access to the original image.

SUMMARY

According to one aspect of the present invention, a digital image is hardcopy watermarked by modifying transform coefficients in a transform domain representation of the digital image, the transform coefficients being modified according to bit values of a message. According to another aspect of the present invention, a message in a hardcopy watermarked image is identified by statistically decoding a transform domain representation of the watermarked image. Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1 is an illustration of a hardcopy watermarking system.

FIG. 2 is an illustration of an encoder of hardcopy watermarking system.

FIG. 3 is an illustration of a decoder of the hardcopy watermarking system.

DETAILED DESCRIPTION

Figure 4:
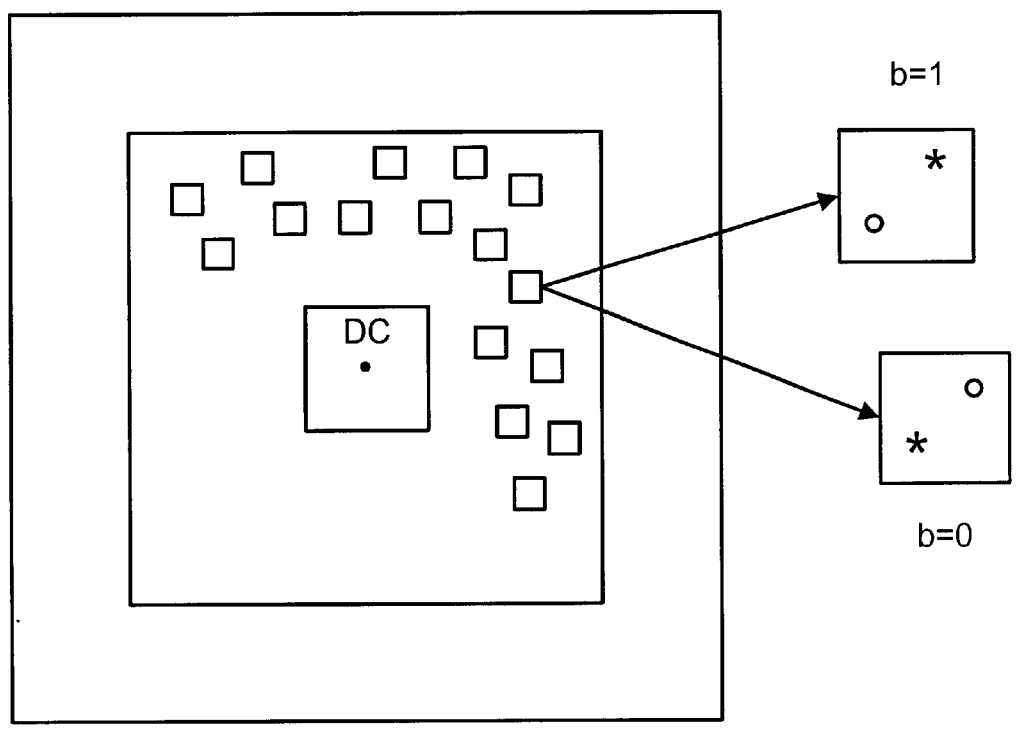
FIG. 4 is an illustration of exemplary locations of image transform coefficients that are modified by the system.

As shown in the drawings for purposes of illustration, the present invention is embodied in a hardcopy watermarking system for embedding an n-bit "message" in a digital image and subsequently identifying the message in a hardcopy of the digital image. The message may convey, for example, information about the image, information about the owner of the image, anti-counterfeit information, etc. The hardcopy watermarking performed by the system is robust, has a high coding rate, and does not degrade the visual quality of the hardcopy. The message may be identified without resorting to the original image. Instead, the message may be identified from a degraded/printed/scanned version of the digital image.

Reference is made to FIG. 1, which shows a hardcopy watermarking system 10 for encoding an n-bit digital "message" (m) in a digital input image ($i_O$) and later identifying the message (m*). Pixels of the input image ($i_O$) may be represented by k-bit words. For example, each k-bit word may indicate red, green and blue components of its corresponding pixel.

The system 10 includes an encoder 12, a printing/scanning channel 14, and a decoder 16. The encoder 12 transforms the input image ($i_O$) to a transform domain representation (e.g., DCT) and modifies selected transform coefficients of the representation according to the bit values of the message (m). Transform coefficients in the middle frequency region are selected for modification. An output of the encoder 12 provides a watermarked image ($i_W$).

In the printing/scanning channel 14, a hardcopy of the watermarked image ($i_W$) is made, and the hardcopy is subsequently converted back to a digital image ($i_S$). For example, the watermarked image ($i_W$) is printed out and subsequently scanned. The printing, scanning, and other affects (e.g., cropping, misalignment, stains and scratches) add noise (r) to the scanned image ($i_S$). If the scanned image ($i_S$) is represented in a frequency transform domain, the noise (r) would typically 1) wipe out transform coefficients in the high frequency regions and attenuate the transform coefficients in the middle frequency regions and 2) add statistically independent noise to both regions.

However, the transform coefficients that were modified by the encoder 12 are significantly different than the transform coefficients of the input image ($i_O$). In modifying the transform coefficients, the encoder 12 creates a strong watermark signal in the watermarked image ($i_W$), strong enough to leave a "trace" in the transform coefficients of the scanned image ($i_S$). This trace is still detectable in the transform domain representation of the scanned image ($i_S$).

The decoder 16 uses statistical techniques to estimate the message (m*) in a transform domain representation of the scanned image($i_S$). The message is estimated because the modified transform coefficients have been attenuated in the transform domain representation of the scanned image ($i_S$). Each bit of the message is estimated according to the probability of being either a '0' or a '1'. One such statistical technique is a "Maximum Likelihood" technique.

The decoder 16 can estimate the message (m*) without resorting to the input image ($i_O$). If, however, the decoder 16 has access to the input image ($i_O$), the statistics will be more accurate and, consequently, the estimate of the message will be more accurate. Error correction code techniques may be used to improve the accuracy of the estimate and thereby further increase robustness.

The encoder 12 may be realized by a computer having a processor and memory, the encoder memory storing instructions for instructing the encoder processor to perform the encoding. The decoder 16 may be realized by a computer having a processor and memory, the decoder memory storing instructions for instructing the decoder processor to perform the decoding.

Reference is now made to FIG. 2, which shows the encoder 12 in greater detail. The encoder 12 transforms the input image ($i_O$) into a transform domain representation ($i_T$) (block 102). Exemplary transform domains include Discrete Cosine Transform (DCT), Digital Fourier Transform (DFT) and Discrete Wavelength Transform (DWT).

The encoder 12 receives the message (m) and adds redundancy data to the message (block 104). The redundancy data is used as an error correction code (ECC). Resulting is an N-bit message ($B=[b_1, b_2, \ldots, b_N]$).

The encoder 12 selects 2N of the transform coefficients in the middle frequency region of the transform domain representation ($i_T$). These image transform coefficients may be pseudo-randomly selected.

The selected 2N transform coefficients are modified according to bit values of the message (B):

$x_{2i-1}=f_u(s_{2i-1}), x_{2i}=f_l(s_{2i})$ for b=0

$x_{2i-1}=f_l(s_{2i-1}), x_{2i}=f_u(s_{2i})$ for b=1 where $s_i$ represents the $i^{th}$ transform domain coefficient that is selected and $0 < i \leq N$; and where $x_i$ is the $i^{th}$ coefficient that is modified (block 106). The function $f_u$ represents an upper embedding function, which adds substantial energy to a coefficient; and the function $f_l$ represents a lower embedding function, which substantially reduces energy in a coefficient. Substantially adding/reducing this "distortion" energy creates a strong watermark signal that can survive the printing/scanning channel 14. Thus if the input image ($i_O$) contains K transform coefficients, the watermarked image ($i_W$) contains 2N modified coefficients (X) and K-2N of the original transform coefficients.

The encoder 12 inverts the watermarked domain transform representation ($i_T$) to obtain the watermarked image $i_W=F^{-1}(i_T)$ (block 108). Noise reduction may be performed on the image ($i_W$) to reduce artifacts and improve image quality (block 110). For example, the encoder 12 may determine smoothness of small neighborhoods of pixels in the image ($i_W$). If a neighborhood is smooth, the encoder 12 reduces the strength of the watermark signal ($i_W$-$i_O$) in the smooth neighborhood by an attenuation factor having a value between [0,1]. The value of the attenuation factor is inversely related to the smoothness measure.

The total amount of distortion energy that is added to the transform coefficients is application-specific. To ensure that the hardcopy of the watermarked image ($i_W$) is perceptually similar to the hardcopy of the input image ($i_O$), the total amount of distortion energy may be subject to a distortion constraint $$\frac{1}{2N} \sum d_i(x_i, s_i) < D$$

where $d_i(\bullet)$ are distortion measures and D is a distortion level. The tradeoff between visual quality and coding rate is determined by the parameters N and D. Increasing the number of watermark transform coefficients and/or increasing the coefficient distortion results in a higher information rate but a lower image quality. Conversely, decreasing the number of watermark transform coefficients and/or decreasing the coefficient distortion results in a lower information rate but a higher image quality.

Performing the noise reduction reduces the distortion energy in the smooth areas, but it does not affect the distortion energy in the non-smooth pixel neighborhoods. However, it allows more total distortion energy to be added to the transform coefficients for the same visual quality, than if noise reduction was not performed.

Reference is now made to FIG. 3, which shows the decoder 16 in greater detail. The decoder 16 aligns and resizes the scanned image ($i_S$) to match the dimensions and orientation of the input image ($i_O$) (block 202). The decoder 16 then computes a transform domain representation of the resized/realigned image using the same transform used by the encoder 12 (block 204). The decoder 16 also selects the same 2N transform coefficients (Y) that were modified by the encoder 12 (block 206). The selected transform coefficients (Y) will probably be different than the modified transform coefficients (X) due to noise added by the printing/scanning channel 14.

To perform the resizing/alignment (block 202) and the selection of the 2N coefficients (block 204), the decoder 16 already knows the size/alignment of the input image ($i_O$) and the locations of the 2N modified coefficients. There might be an advance agreement between the encoder 12 and the decoder 16 as to the image size (e.g., 600×600 pixels), the alignment, and the locations of the modified transform coefficients. In the alternative, the encoder 12 might pass information regarding the size and alignment of the input image ($i_O$) and the location of the modified transform coefficients to the decoder 16.

The decoder 16 uses the selected transform coefficients (Y) to estimate statistics parameters: a first conditional probability of the coefficients changed by the upper embedding function $f_u$, and a second conditional probability of the coefficients changed by the lower embedding function $f_l$ (block 208). The first conditional probability, $P(y_{2i-1}, y_{2i}|b_i=1)$, is the probability of observing the coefficients $y_{2i-1}$ and $y_{2i}$ given that $b_i=1$. The second conditional probability, $P(y_{2i-1}, y_{2i}|b_i=0)$, is the probability of observing the coefficients $y_{2i-1}$ and $y_{2i}$ given that $b_i=0$.

An N-bit binary sequence B* is estimated (block 210). The binary sequence B* may be estimated by using a maximum likelihood (ML) algorithm. The ML algorithm utilizes the first and second conditional probabilities to calculate the probability of observing the pairs of transform coefficients $y_{2i-1}$ and $y_{2i}$, for each $i=1, \ldots, N$, given that the corresponding message bit is 0 or 1. Using the ML algorithm, the decoder 16 enumerates over all possible N-bit messages (C), where N is the agreed upon encoded message length, and assigns to each one of them a score Sc(C). The score may be computed as follows.

$$Sc(C) = P\{Y \mid C\} = P\{(y_1, \ldots, y_{2N}) \mid (c_1, \ldots, c_N)\} = \prod_{i=1}^{N} P(y_{2i-1}, y_{2i} \mid c_i)$$

The message (C) having the highest score is selected as the estimated sequence B*.

The estimated N-bit sequence B* is then ECC-decoded (block 212) to obtain the estimated message (m*). The ECC decoding improves the accuracy of the estimate.

An exemplary embodiment of the hardcopy watermarking system 10 will now be described.

On the encoding side, a DFT transform of the input image ($i_O$) is computed. The DFT coefficients are cyclically rotated in such a way that the DC coefficient is in the center of the coefficient matrix.

N pairs of transform coefficients are chosen in the middle frequency range of the DFT domain. Each pair may be located in a fixed position relative to a small square. These non-overlapping squares are scattered in a pseudo random pattern in half of a middle frequency ring in the DFT domain (see FIG. 4, where * denotes a coefficient having its magnitude increased, and o denotes a coefficient having its magnitude reduced). The scattering is designed to prevent the appearance of artifacts in the watermarked image.

A message (m) is ECC-encoded using a linear error correcting code that maps blocks of message bits into an appropriate code words.

The resulting binary sequence B, of length N, is used to modify 2N image transform coefficients (S). Each pair of coefficients $s_{2i}$, $s_{2i-1}$ is converted to $x_{2i}$ and $x_{2i-1}$, respectively, according to the sign of the corresponding encoded message bit as follows:

(1) If the $B_i$ bit has the value '0', the absolute value of $s_{2i}$, is increased by a constant factor, (determined by the distortion level D) and the absolute value of $s_{2i-1}$ is decreased to a negligible value. The polarity (the sign for a real coefficient or the phase of a complex coefficient) of both $s_{2i}$ and $s_{2i-1}$ are preserved.

(2) If the $B_i$ bit has the value '1', the absolute value of $s_{2i}$ is decreased to a negligible value and the absolute value of $s_{2i-1}$ is increased by a constant factor. The polarity of both $s_{2i}$, and $s_{2i-1}$ are preserved.

Resulting is a transform domain representation including modified transform coefficients (X). In order to preserve real values for the watermarked image pixels, the DFT coefficients symmetric to the entries of the sequence (X) are changed in such a way that each symmetric coefficient is the complex conjugate of the corresponding watermarked entry.

The watermarked DFT domain representation is inverted to obtain the watermarked image. Visual artifacts introduced by the watermark signal in smooth pixel neighborhoods are attenuated to obtain the final watermarked image. The watermarked image is printed.

On the decoding side, the decoder 16 receives the scanned image ($i_s$) and realigns and resizes the scanned image to dimensions and an orientation that match the input image. The decoder 16 computes the DFT transform of the resized, reoriented image and chooses the N pairs of transform coefficients having the same positions as coefficient pairs selected and modified by the encoder 12.

Next the decoder 16 estimates the probability distributions of two families of coefficients from the selected sequence Y, corresponding to the upper and lower embedding functions $f_u$ and $f_l$. The order in each coefficient pair is determined by the sign of the corresponding message bit. If no noise was introduced by the scanning/printing channel 14, the decoder 16 could decode a message bit from each pair simply by observing which of the coefficients has higher energy. However, the noise introduced by the printing/scanning channel 14 can reverse the energy order of some of the pairs. The decoder 16 estimates, for each pair, the probabilities of both coefficients originating from a low energy or a high energy "clean" coefficient. Therefore, at the decoder 16, there are two probability distributions: $P_l(t)$ is the probability that an originally "low energy coefficient" has the energy value "t" and $P_u(t)$ is the probability that an originally "high energy coefficient" has the energy value "t".

These probability distributions are constructed as follows. The decoder 16 selects from each of the coefficient pairs the one coefficient that has the higher energy. For this "high energy" coefficient set it estimates the parameters $\alpha_x$, $\beta_x$, based on the assumption that the underlying distribution is a Gamma probability distribution function (pdf) $G\alpha_x,\beta_x(t)$ The decoder 16 then selects the remaining coefficients (those that have the lower energy in each pair) and for this "low energy" coefficient set it estimates the parameters $\alpha_n$ and $\beta_n$ based on the assumption that the underlying distribution is a Gamma pdf $G\alpha_n,\beta_n(t)$ The decoder 16 now assumes a (relatively high but not equal to one!) probability ($p_c$) that the order of the coefficients energy in a pair is preserved, despite printing/scanning noise. Therefore the actual probabilities $P_l(t)$ and $P_u(t)$ are given by a mixture of two Gamma pdfs:

$$P_u(t)=p_c G\alpha_x,\beta_x(t)+(1-p_c)G\alpha_n,\beta_n(t)$$

$$P_l(t)=(1-p_c)G\alpha_x,\beta_x(t)+p_c G\alpha_n,\beta_n(t)$$

A score Sc(C) for each possible message (C) is estimated from the selected sequence Y using the following ML algorithm. The score represents the log of the conditional probability of observing the values of the coefficients in the selected sequence Y, given that the message (C) was transmitted.

$$Sc(C) = \prod_{i=1}^{n} \{P_u(y_{2i-1})P_l(y_{2i})\delta(c_i - 0) + P_l(y_{2i-1})P_u(y_{2i})\delta(c_i - 1)\}$$

where $\delta(\bullet)$ is a standard delta function.

The binary sequence (C) with the highest score is chosen as the estimated sequence B* and is subsequently ECC-decoded to obtain the estimated message (m*).

The present invention is not limited to the specific embodiments described and illustrated above. Instead, the present invention is construed according to the claims that follow.

What is claimed is:

1. A method of hardcopy watermarking a digital image with a message, the method comprising modifying a plurality of transform coefficients in a transform domain representation of the image, the transform coefficients being modified according to bit values of the message; wherein each pair of modified transform coefficients is derived from a pair of original transform coefficients; wherein for each pair a first modified coefficient has a substantially higher energy than a first original transform coefficient, and a second modified coefficient has a negligible energy; and wherein for each pair the first modified coefficient has substantially higher energy than the second modified coefficient.

2. The method of claim 1, further comprising ECC-encoding the message prior to modifying the image transform coefficients.

3. The method of claim 1, wherein locations of the modified image transform coefficients are chosen from a middle frequency band of a transform domain representation of the image.

4. The method of claim 1, wherein the order in the first and second modified coefficients in a pair depends upon the value of the corresponding bit of the message.

5. The method of claim 1, wherein the first modified coefficient of each pair is derived from an upper embedding function and the second modified coefficient of each pair is derived from a lower embedding function.

6. The method of claim 5, wherein for an encoded message bit having a value of '0', the absolute value of the first modified coefficient is the sum of the first original coefficient and a constant factor, and the absolute value of the second modified coefficient is a negligible value; and wherein for an encoded message bit having a value of '1', the absolute value of the second modified coefficient is the sum of the second original coefficient and a constant factor, and the absolute value of the first coefficient is a negligible value.

7. The method of claim 1, further comprising performing an inverse transform on the transform domain representation after modification of the transform coefficients.

8. The method of claim 1, further comprising reducing amplitude of a watermark in smooth regions of the image.

9. The method of claim 1, wherein energy added to the transform coefficients is subject to a distortion constraint.

10. A method of identifying a message in a transform domain representation of a scanned hardcopy watermarked image, the method comprising statistically decoding the message in the transform domain representation; wherein the decoding includes using statistics parameters that are based on an ordering of coefficients within selected coefficient pairs, and wherein each bit of the decoded message depends on the ordering of the coefficients within a corresponding coefficient pair.

11. The method of claim 9, wherein the statistics parameters include a first conditional probability of the coefficients modified by increasing energy and a second conditional probability of the coefficients modified by reducing energy.

12. The method of claim 11, wherein the first conditional probability is the probability of observing the coefficients given that $b_i=1$, and the second conditional probability is the probability of observing the coefficients given that $b_i=0$, where $b_i$ is the $i^{th}$ bit of the message.

13. The method of claim 12, wherein a maximum likelihood technique is used to estimate the message.

14. The method of claim 13, wherein a plurality of possible messages are derived, a score is computed for each possible message, and the possible message having the best score is selected as the estimated message.

15. The method of claim 12, wherein the conditional probabilities are based on Gamma probability distribution functions.

16. The method of claim 12, wherein each coefficient pair of the selected sequence includes a high-energy coefficient and a low-energy coefficient.

17. The method of claim 11, wherein each pair of coefficients in the message is examined, higher and lower energy coefficients in each pair are identified, a first set of probability distribution parameters for those coefficients having the higher energy is estimated, a second set of probability distribution parameters for those coefficients having the lower energy is estimated, the first set of probability distribution parameters is used to determine the first probability, and the second set of probability distribution parameters is used to determine the second probability, the first and second sets of parameters based on a specific probability distribution function.

18. Apparatus for hiding a message in a hardcopy image, the apparatus comprising a processor for modifying a plurality of transform coefficients in a transform domain representation of the image, the transform coefficients being modified according to bit values of the message, wherein each pair of modified transform coefficients is derived from a pair of original transform coefficients, wherein for each pair a first modified coefficient has a substantially higher energy than a first original transform coefficient, and a second modified coefficient has a negligible energy, and wherein for each pair the first modified coefficient has substantially higher energy than the second modified coefficient.

19. The apparatus of claim 18, wherein the processor ECC-encodes the message prior to modifying the transform coefficients.

20. The apparatus of claim 18, wherein the processor chooses the coefficients to modify from a middle frequency band of the transform domain representation of the image.

21. The apparatus of claim 18, wherein the processor performs an inverse transform on the transform domain representation after the coefficients have been modified, and reduces watermark amplitude in smooth regions of the image produced by the inverse transform.

22. The apparatus of claim 18, wherein the processor modifies the order in the first and second modified coefficients in a pair according to the value of the corresponding bit of the message.

23. The apparatus of claim 18, wherein the first modified coefficient of each pair is derived from an upper embedding function and the second modified coefficient of each pair is derived from a lower embedding function.

24. The apparatus of claim 23, wherein for an encoded message bit having a value of '0', the absolute value of the first modified coefficient is the sum of the first original coefficient and a constant factor, and the absolute value of the second modified coefficient is a negligible value; and wherein for an encoded message bit having a value of '1', the absolute value of the second modified coefficient is the sum of the second original coefficient and a constant factor, and the absolute value of the first coefficient is a negligible value.

25. The apparatus of claim 18, wherein energy added to the transform coefficients is subject to a distortion constraint.

26. Apparatus for estimating a message in a transform domain representation of a scanned hardcopy watermarked image, the apparatus comprising a processor for statistically decoding the message in the transform domain representation, wherein the decoding includes generating statistics parameters according to an ordering of coefficients within selected coefficient pairs, and wherein each bit of the estimated message depends on the ordering of the coefficients within a corresponding coefficient pair.

27. The apparatus of claim 26, wherein the statistics parameters include a first conditional probability of the coefficients modified by increasing energy and a second conditional probability of the coefficients modified by reducing energy.

28. The apparatus of claim 27, wherein the first conditional probability is the probability of observing the coefficients given that $b_i=1$, and the second conditional probability is the probability of observing the coefficients given that $b_i=0$, where $b_i$ is the $i^{th}$ bit of the message.

29. The apparatus of claim 27, wherein the processor examines each pair of coefficients in the message, identifies higher and lower energy coefficients in each pair, estimates a first set of probability distribution parameters for those coefficients having the higher energy, estimates a second set of probability distribution parameters for those coefficients having the lower energy, uses the first set of probability distribution parameters to determine the first probability, and uses the second set of probability distribution parameters to determine the second probability, the first and second sets of parameters based on specific probability distribution functions.

30. The apparatus of claim 29, wherein the specific probability distribution functions are Gamma probability distribution functions.

31. The apparatus of claim 26, wherein each coefficient pair of the selected sequence includes a high-energy coefficient and a low-energy coefficient.

32. An article for a processor, the article comprising computer memory encoded with a plurality of instructions for instructing the processor to hardcopy watermark an image by modifying a plurality of transform coefficients in a transform domain representation of the image, the transform coefficients being modified according to bit values of the message; wherein each pair of modified transform coefficients is derived from a pair of original transform coefficients; wherein for each pair a first modified coefficient has a substantially higher energy than a first original transform coefficient, and a second modified coefficient has a negligible energy; and wherein for each pair the first modified coefficient has substantially higher energy than the second modified coefficient.

33. The article of claim 32, wherein the processor is instructed to ECC-encode the message prior to modifying the transform coefficients.

34. The article of claim 32, wherein the coefficients to modify are selected from a middle frequency band of the transform domain representation of the image.

35. The article of claim 32, wherein the processor is instructed to perform an inverse transform on the transform domain representation after the coefficients have been modified, and reduce watermark amplitude in smooth regions of the image produced by the inverse transform.

36. An article for a processor, the article comprising computer memory encoded with a plurality of instructions for instructing the processor to process a degraded version of a hardcopy watermarked image, the processing including using statistics parameters to statistically decode a message in a transform domain representation of the degraded version of the image, the statistics parameters based on an ordering of coefficients within selected coefficient pairs, each bit of the decoded message depending on the ordering of the coefficients within a corresponding coefficient pair.

37. The article of claim 36, wherein the statistics parameters include a first conditional probability of the coefficients modified by increasing energy and a second conditional probability of the coefficients modified by reducing energy.

38. The article of claim 37, wherein the first conditional probability is the probability of observing the coefficients given that $b_i=1$, and the second conditional probability is the probability of observing the coefficients given that $b_i=0$, where $b_i$ is the $i^{th}$ bit of the message.

39. The article of claim 37, wherein the processor is instructed to examine each pair of coefficients in the message, identify higher and lower energy coefficients in each pair, estimate a first set of probability distribution parameters for those coefficients having the higher energy, estimate a second set of probability distribution parameters for those coefficients having the lower energy, use the first set of probability distribution parameters to determine the first probability, and use the second set of probability distribution parameters to determine the second probability, the first and second sets of parameters based on a specific probability distribution function.

40. The article of claim 36, wherein each coefficient pair of the selected sequence includes a high-energy coefficient and a low-energy coefficient.

41. A system comprising:
a encoder for hardcopy watermarking a digital image with a message by modifying a plurality of transform coefficients in a transform domain representation of the image, the transform coefficients being modified according to bit values of the message, each pair of modified transform coefficients derived from a pair of original transform coefficients; where for each pair a first modified coefficient has a substantially higher energy than a first original transform coefficient, a second modified coefficient has a negligible energy, and the first modified coefficient has substantially higher energy than the second modified coefficient; and
a decoder for statistically decoding the message in a transform domain representation of a degraded version of the image.

* * * * *